(12) United States Patent
Gramss et al.

(10) Patent No.: US 6,805,411 B2
(45) Date of Patent: Oct. 19, 2004

(54) NECK REST FOR THE SEATS OF AUTOMOBILES

(75) Inventors: Rainer Gramss, Iserlohn (DE); Carsten Albracht, Iserlohn (DE)

(73) Assignee: ITW Automotive Products GmbH & Co. KG (DE)

( * ) Notice: Subject to any disclaimer, the term of this patent is extended or adjusted under 35 U.S.C. 154(b) by 46 days.

(21) Appl. No.: 10/372,385

(22) Filed: Feb. 25, 2003

(65) Prior Publication Data

US 2004/0021358 A1 Feb. 5, 2004

(30) Foreign Application Priority Data

Feb. 27, 2002 (DE) .......................................... 102 08 620

(51) Int. Cl.[7] .................................................. A47C 1/10
(52) U.S. Cl. ........................ 297/408; 297/391; 297/410; 297/409; 297/216.12
(58) Field of Search ................................ 297/391, 396, 297/404, 406, 407, 408, 410, 409, 216.12

(56) References Cited

U.S. PATENT DOCUMENTS 5,664,841 A * 9/1997 Dal Monte .................. 297/408
6,082,817 A * 7/2000 Muller .................... 297/216.12
6,688,697 B2 * 2/2004 Baumann et al. ............ 297/391

FOREIGN PATENT DOCUMENTS

| DE | 3347255 | * | 7/1985 |
| DE | 34 04 612 | | 8/1985 |
| DE | 39 00 495 | | 7/1990 |
| DE | 100 30 549 | | 1/2002 |
| GB | 2037154 | * | 7/1980 |
| GB | 2363323 | | 12/2001 |

* cited by examiner

Primary Examiner—Laurie K. Cranmer
(74) Attorney, Agent, or Firm—Lowe Hauptman Gilman & Berner, LLP

(57) ABSTRACT

A neck rest includes a first support, a second support pivotably supported on the first support, and third support displaceably supported on the second support between a lower and an upper position. A controllable locking mechanism retains the third support in the lower position, the locking mechanism being unlocked when the second support has a attained a predetermined pivot angle. A stop is placed between second and/or third support and first support to prevent a pivoting of the second and the third supports towards the first support when the second and third supports have a attained their extended position.

8 Claims, 3 Drawing Sheets

NECK REST FOR THE SEATS OF AUTOMOBILES

The invention relates to a neck rest for the seats of automobiles as claimed in claim 1.

Commonly, neck rests comprise a cushion member which is displaceably mountable by means of two rods in the back rest of a sear, the rods being inserted in neck rest sleeves of the back rests. The cushion member is retained by a support member which is fixedly connected to the neck rest rods.

As a general rule, neck rests are arranged in a wrong or inadequate manner in a vehicle, in a position which is not always adapted to the driver's or front-seat passengers needs. If an accident occurs by a rear-end collision a large distance between the head and the neck rest causes heavy strains in the nape of the neck, which might result in significant lesions to the nuchal region. In particular, misadjustment is provoked by too low a position of the neck rest on the back of the seat.

It has become known from DE 39 00 495 to provide a displaceable cushion member. It has become known from DE 199 47 309 to provide a front-end pivotable neck rest member which is pivotally supported about an upper horizontal axis and is actuated, for instance, by an airbag.

It is the object of the invention to configure a neck rest with an extendable cushion member in a way such as to assume a position, in a response case, which ensures an efficient interception of forces acting upon the head of a person.

The object is achieved by the features of claim 1.

In the inventive neck rest, a second support member is pivotally supported on the first support member about a lower horizontal axis. The actuation means include spring means which bias the second support member towards the pivoted position. A controllable locking means retains the second support member in an extended position relative to the first support member against the spring. A third support member is displaceably supported on the second support member between a lower and an upper position. The third support means is biased towards the upper position by a second spring means. A controllable second locking means retains the third support member in the lower position, the second locking means being unlocked when the second support member has attained a predetermined pivoting angle. Finally, stop means are provided which act between the second and/or third support member and the first support member when the second and third support members have attained their extended position. The stop means provide for the second and third support members to remain in the extended position and absorb the force when the head exerts an appropriate force towards the first support member.

The fact that a second support member is provided may ensure that the third support member has an optimum position relatively close to the head in which the nape of the neck or the back of the head of a person sitting on the seat shoots to the rear because of a collision bump. Although the second support member will then be extended to the front towards the sitting person the second support member is directly or obliquely pushed to the top so that a bump acting towards the head of the sitting person will not occur. In fact, when supported appropriately, the third support member helps achieve a position in which an optimum force absorption is attained with the sitting person facing no risk of injury.

The second support member requires to be locked in the retracted position. This can be accomplished by means of a pawl pivotally supported on the first support member which grips behind an edge or undercut on the second support member. The pawl can be actuated in an appropriate manner, e.g. via a Bowden cable, so that if an accident occurs unlocking is possible immediately.

According to an aspect of the invention, the first spring means are formed by a leaf spring or leg spring. The second spring means are preferably a so-called roll spring which, when in the retracted position, i.e. rolled-up position, applies a bias to the third support member.

According to another aspect of the invention, the first support member has formed thereon at least one stop surface which cooperates with an extension of the third or second support members, the extension facing towards the first support member. When the third support member is displaced into the extended position on the second support member the extension is capable of continuously cooperating with the stop surface so that stabilization is ensured in any position. A further surface located below the stop surface thus enables the extension to cooperate with said lower surface so as to lock the third support member in the lower position.

A guiding surface is disposed between the second and third support members to allow the third support member to be moved along the second support member. According to an aspect of the invention, said guiding surface is curved like an bow so that the above described upward motion of the third support member is brought about at least at the end of the displacement path.

The second support member is hinged to the first one above the pivoting axis to make the second support member pivot only at a predetermined angle. This hinge can be realized by a rope or even by a toggle joint.

An embodiment will be described in more detail below with reference to the drawings.

FIG. 1 schematically shows a side view of a neck rest according to the invention.

Figure 1:
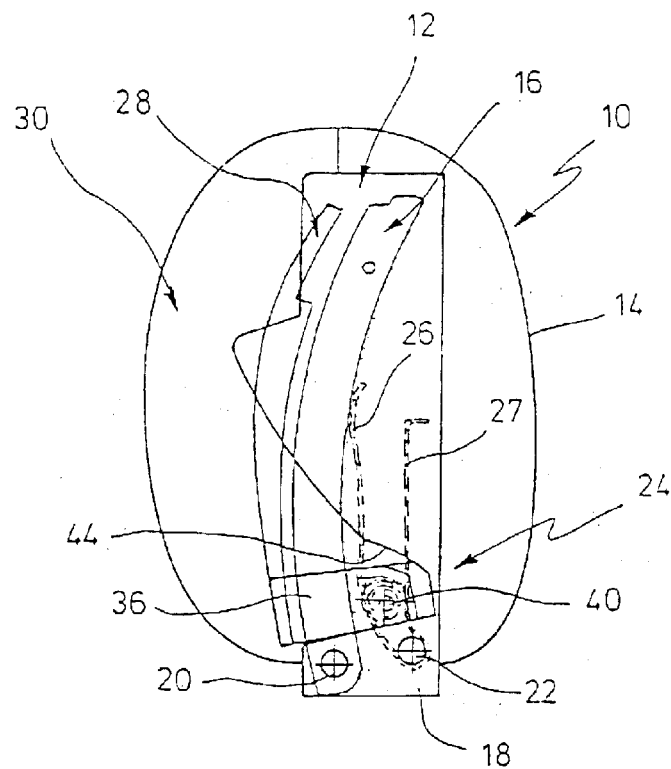
Figure 2:
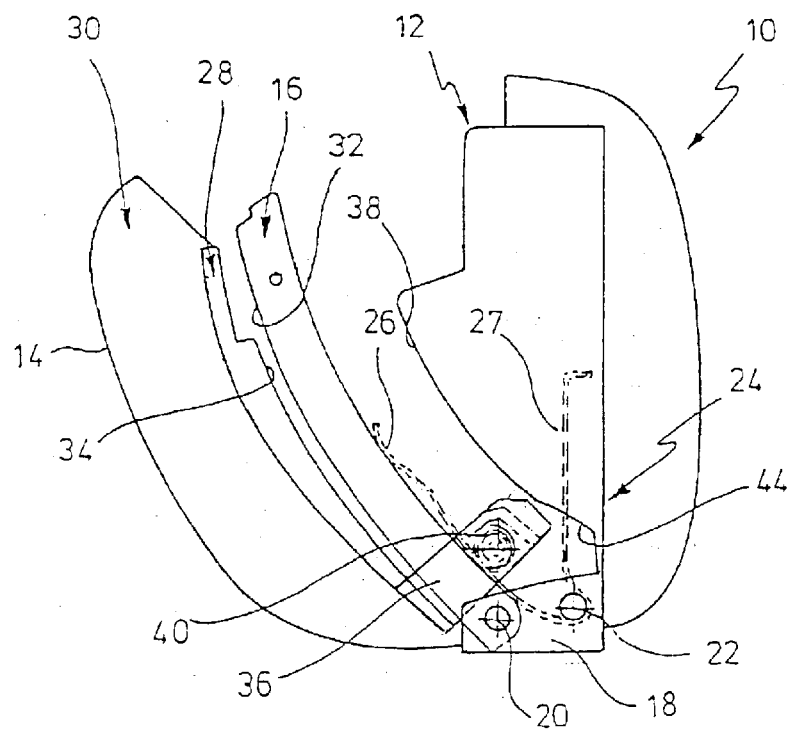
FIG. 2 shows the neck rest of FIG. 1 in a first phase of a displacement motion.
Figure 3:
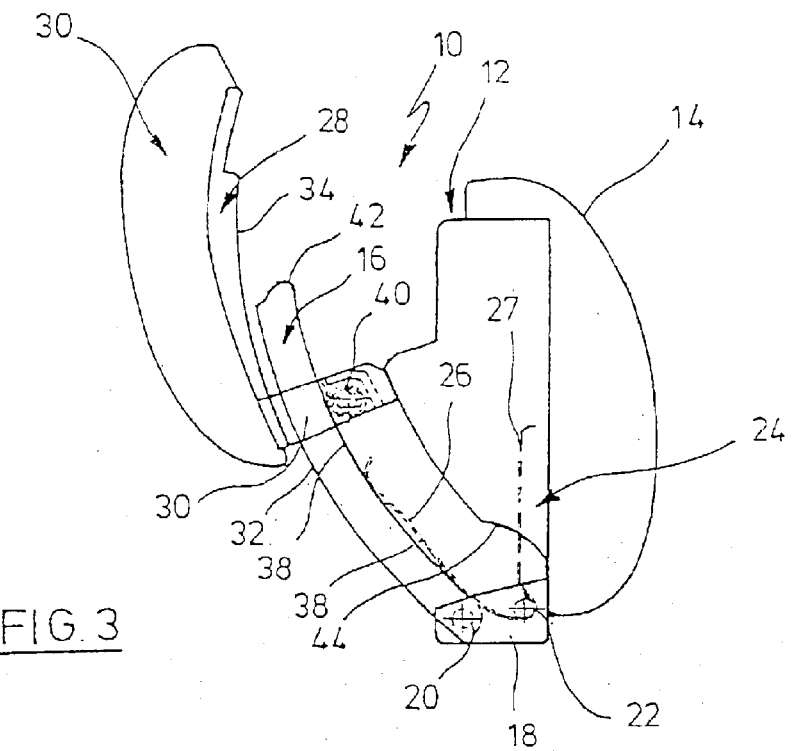
FIG. 3 shows the neck rest of FIGS. 1 and 2 in its finally extended position.

Referring to FIGS. 1 to 3, a neck rest 10 is outlined which may be mounted by means of neck rest rods, which are not shown, in the back rest of a seat which is not shown either. The neck rest has a first support member 12 which is provided with the neck rest rods. The first support member 12 is covered by a cushion member 14. A second support member 16 is pivotally supported about a horizontal axis 20 on an extension 18 of the first support member 12 in the lower region. FIG. 1 illustrates the position received in the support member 12 whereas FIGS. 2 and 3 show the extended pivot position. The position is restricted by a toggle joint, to which reference is made later in conjunction with other figures.

At least one legged spring 24 is arranged on a trunnion 22 of the first support member 12. One leg acts upon the second support member 16, thus biasing the support member 16 to the left in FIGS. 1 to 3. The other leg 27 is stayed on the support member 12.

A third support member 28 is provided with a front-end cushion member 30. The third support member 28 is supported to be displaceable in height on a second support member 16 as is apparent from FIGS. 2 and 3. For this purpose, the second support member has an external first guiding curve or surface 32 and the third support member has a guiding curve or surface 34, which cooperate with each other. The guiding curves 32, 34 are arcuated in a way that if the third support member 28 is in its farthest extended position at least the upper region of the cushion member 30 has its front side extended approximately in an upright plane.

The third support member 28 has two laterally spaced, rearwardly protruding extensions one of which is illustrated at 36. The free end of each extension 36 cooperates with a stop surface 38 of the first support member 12 when the third support member 28 is displaced with respect to the second support member 16 as is illustrated in FIGS. 2 and 3. Therefore, this prevents any motion of the third support member 28 towards the first support member 12 in each of the various positions, even specifically in the fully extended position of FIG. 3.

The extension 36 has disposed therein a roll spring 40 which is fixed to the upper end of the second support member 16 at 42. When in the rolled-up position, the spring is under a bias which permanently biases the third support member 28 towards the upper position as shown in FIG. 3.

A surface 44 which is inclined to the rear is provided below the stop surface 38. What can be seen from FIG. 1 is that the extension 36 bears against this surface 44 when the third support member 28 is in the lower position, which prevents the roll spring 40 from displacing the third support member 28 in an upward direction.

When the members described are in the position illustrated in FIG. 1 the second support member 16 undergoes locking, which action is not shown in FIGS. 1 to 3. If said locking is cancelled the legged spring 24 will initially pivot the unit composed of the second and third support members 16, 28 to the left as is illustrated in FIG. 2. Once a determined pivoting angle is reached the surface 44 releases the extension 36 and the roll spring 40 may now displace the third support member 28 in an upward direction up to the position shown in FIG. 3. The upward displacement of the third support member 28 is limited by a stop which is not shown.

Figure 4:
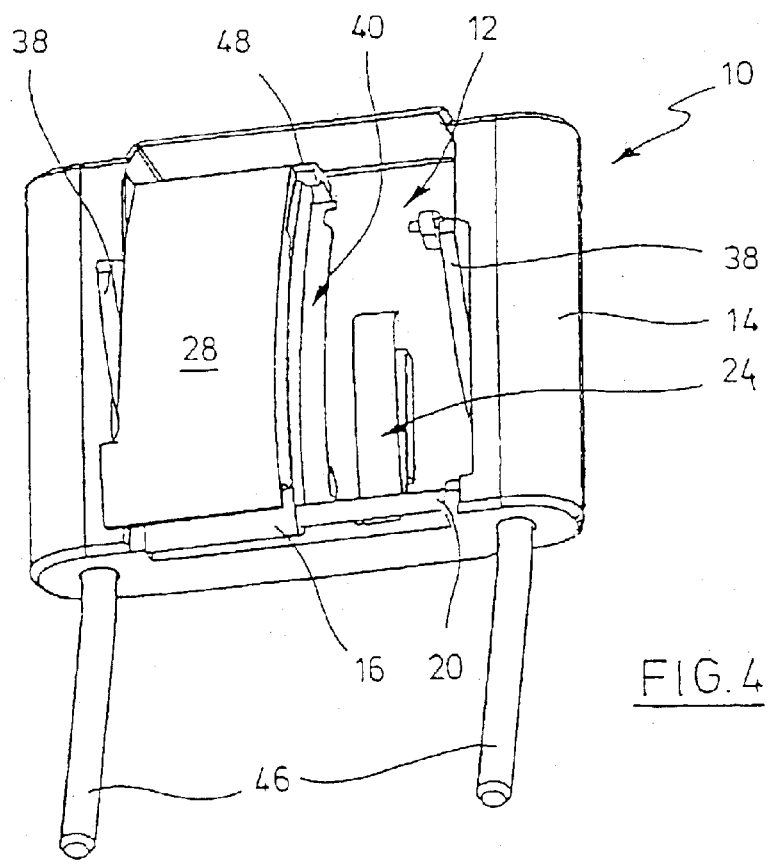
FIG. 4 shows a perspective view of the neck rest of FIG. 1.
Figure 5:
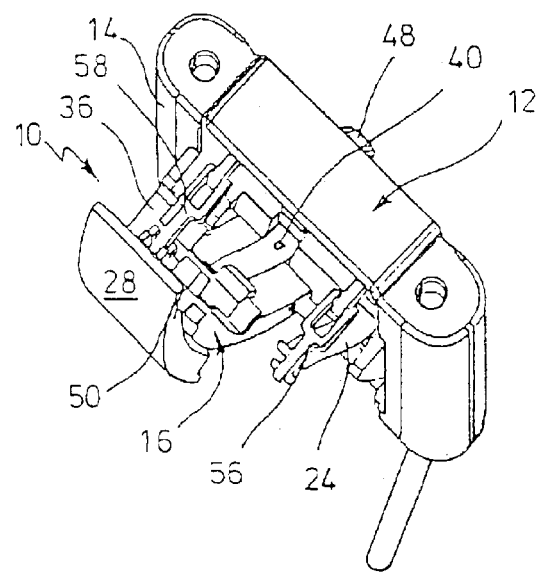
FIG. 5 shows a plan view of the neck rest of FIG. 4 in its extended position comparable to FIG. 3.
Figure 6:
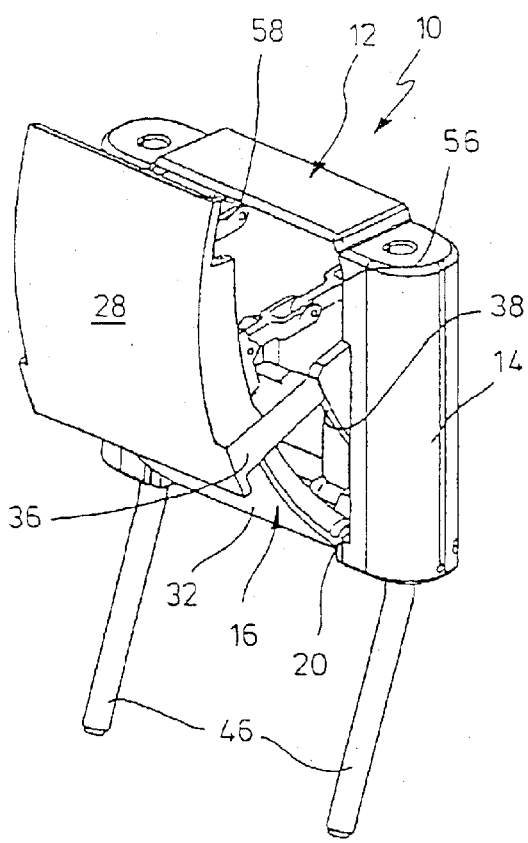
FIG. 6 shows a front view of the neck rest of FIG. 5 in its extended position in a perspective representation.
Figure 7:
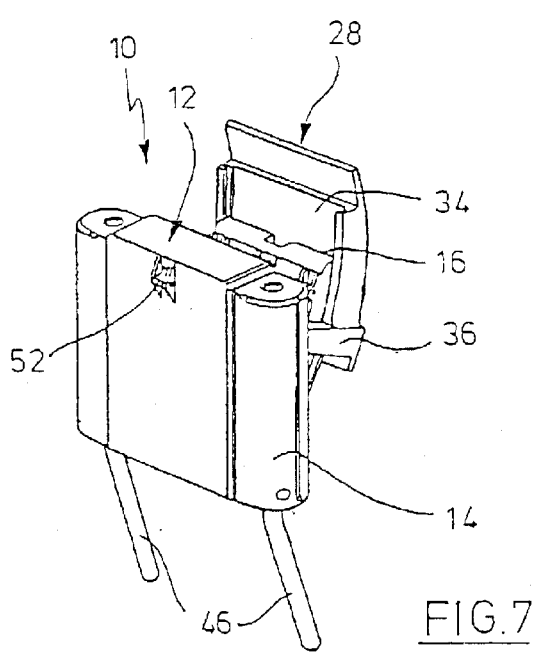
FIG. 7 shows the neck rest of FIG. 6 from the rear in a perspective representation.

FIGS. 4 to 7 show constructional details of the neck rest of FIGS. 1 to 3 with only one half each of the second and third support members being shown in FIGS. 4 and 5. What can be specifically seen in FIGS. 4 to 7 is neck rest rods 46 which are fixedly connected to the first support member 12. FIG. 4, at 48, particularly allows to see a pivotally supported pawl which is caught behind an edge 50 of the second support member 16 when the second support member 16 is in its retracted position, to retain the entire assembly in a retracted position. The pawls 48 projects rearwardly beyond the support member 12 as is illustrated at 52. A Bowden cable or the like, which is not shown, is capable of actuating the pawl in order to release the lock, thus moving the members to the position which is shown in FIG. 6, for instance.

It is evident from FIGS. 4 and 5 that two legged springs 24 are provided on either side of the roll spring 40. FIGS. 4 to 6 make it also evident that two toggle joints 56, 58 join the first support member 12 to the second support member 16 in an articulation with a view to limiting the pivoting motion about the lower axis 20.

What is claimed is:

1. A neck rest for the seats of automobiles comprising a fixed support member and a fixed cushion member enclosing the fixed support member and two rods connected to the support member, the rods being adapted to be accommodated by sleeve members in the back rest of the seat, a second support member for a movable cushion member which is movably supported by the first support member whereby the movable cushion member can be moved between a position wherein it is accommodated by the fixed cushion member and an extended position and vice versa in the extended position the movable cushion member is moved relative to the fixed cushion member towards the head of the person seating on the seat, and actuating means for the actuation of the movable cushion member into the extended position, characterized by the further features:

The second support member (16) is pivotably supported on the first support member (12) about a lower horizontal axis, the actuation means include spring means (24) which bias the second support member (16), a controllable locking means (48) retains the second support member (16) in the extended position relative to the first support member (12), a third support member (28) is displaceably supported on the second support member (16) between a lower and an upper position, the third support member (28) is biased towards the upper position by second spring means (40), a controllable second locking means (36, 44) retains the third support member (28) in the lower position, the second locking means being unlocked when the second support member (16) has attained a predetermined pivot angle and stop means (38) between second and/or third support member (16, 28) and first support member (12) to prevent a pivoting of the second and the third support member towards the first support member (12) when the second and third support member have attained their extended position.

2. The neck rest of claim 1, wherein the spring means (24) include a leaf spring or a leg spring.

3. The neck rest of claim 1, wherein the second spring means include a roll spring.

4. The neck rest of claim 1, wherein the stop means include a stop surface (38) on the first support member (12), the stop surface cooperating with an extension (36) of the third support member (28) the extension facing towards the first support member (12) and moving along the stop surface (38) when the third support member is displaced into the extended position.

5. The neck rest of claim 4, wherein the stop surface (38) defines a second locking means in conjunction with a lower surface portion (44) and the extension (36).

6. The neck rest of claim 5, wherein the stop surface (38) has the same curvature as the guiding surface (32).

7. The neck rest of claim 1, wherein a guiding surface (32) on the second support member (16) for the third support member (28) is curved such that the front side of the third support member (28) or of the movable cushion member is approximately in an upright plane when the third support member is in the extended position.

8. The neck rest of claim 1, wherein the second support member (16) is linked to the first support member above the horizontal pivoting axis (20) such that the pivoting angle of a second support member (16) is restricted.

* * * * *